May 16, 1967 MASAKA OGI ET AL 3,320,540

FM DEMODULATOR OF DISTRIBUTED CONSTANT DELAY LINE TYPE

Filed July 27, 1964 2 Sheets-Sheet 1

United States Patent Office 3,320,540

Patented May 16, 1967

3,320,540

FM DEMODULATOR OF DISTRIBUTED CONSTANT DELAY LINE TYPE

Masaka Ogi, Tokyo, and Tomoyoshi Yamashita, Kawasaki, Japan, assignors to Fujitsu Limited, Kawasaki, Japan, a corporation of Japan Filed July 27, 1964, Ser. No. 385,377
9 Claims. (Cl. 329—116)

The present invention relates to an FM demodulator comprising a distributed constant delay line.

FM demodulators of the prior art used in microwave radio apparatus comprise two lumped constant detuned resonant circuits and produce a relative delay time distortion theoretically because the phase characteristic of the output voltage is not linear although the amplitude characteristic is linear. In order to compensate for the relative delay time distortion, a phase equalizer may be utilized. However, the phase equalizer does not provide wide band compensation. Therefore, a phase equalizer is not suitable in a multiplex communication system with a wide band.

A purpose of this invention is to provide an FM demodulator with no relative delay time distortion. Another purpose fo this invention is to provide an FM demodulator with a good demodulation linearity and a good demodulation sensitivity.

The FM demodulator of the present invention attains these purposes by utilizing a distributed constant delay line. The FM demodulator comprises a distributed constant delay line with an electrically equivalent length corresponding to the wavelength of the middle frequency of signal frequency band, a phase shifter which shifts the phase of the output voltage of the delay line without loss, two envelope detectors which detect respectively the voltage between the input point and the output point of the delay line and the voltage between said input point and the output point of the phase shifter, and means for producing differential component of the output voltages of the two detectors.

In order that the present invention may be readily carried into effect, it will now be described with reference to the accompanying drawings, wherein.

Figure 1:
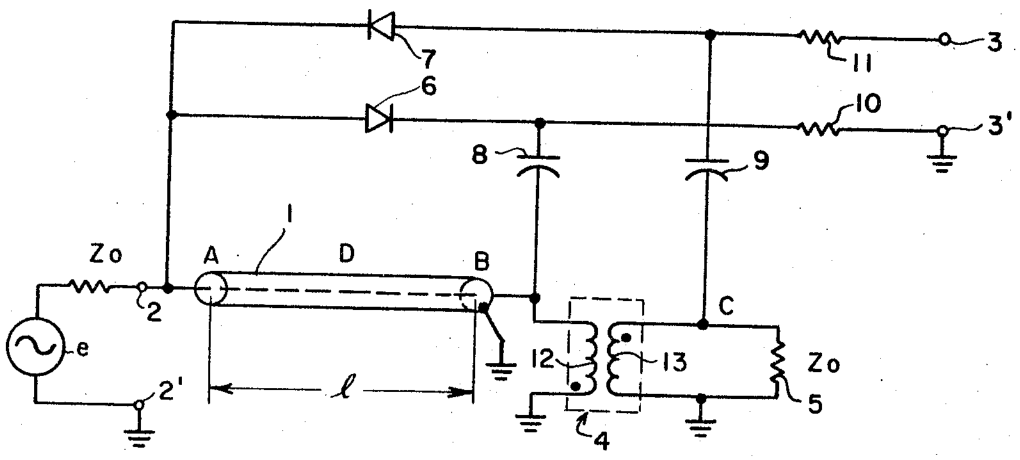
FIG. 1 is a circuit diagram of an embodiment of the FM demodulator of the present invention.

In FIG. 1, which is circuit diagram of this invention, frequency modulated input signals, such as the output signals of the limiter of the intermediate frequency stage of a microwave radio receiver, are supplied to terminals 2 and 2′ of the FM demodulator. The input signals are demodulated by the FM demodulator, and output video signals are provided at output terminals 3 and 3′. The FM demodulator comprises a distributed constant delay line cable 1 having negligibly small loss. A phase shifter 4 may comprise, for example, a transformer with a winding ratio of 1:1, but with its input and output windings wound in the opposite sense from each other. The input winding 12 of the phase shifter or transformer 4 is connected to the output B of the delay lane cable 1 and the output winding 13 of said transformer is terminated by a resistor 5 having an impedance equal to the characteristic impedance $Z_0$ of said delay line cable without reflection. A diode 6 is connected between the input A and the output B of the delay line cable 1 through a capacitor 8. A diode 7 is connected between the input A and the output C of the phase shifter or transformer 4 through a capacitor 9. A resistor 10 is connected between the diode 6 and the output terminal 3′ and a resistor 11 is connected between the diode 7 and the output terminal 3. The input signals may be provided by a signal source *e*, connected across the terminals 2, 2′.

The length *l* of said delay line cable 1 is so designed that its electrically equivalent length is equal to a quarter wavelength of the middle frequency of the input signal frequency band in a free field. Therefore, the phase of the wave at the output B is delayed in accordance with the length *l*. The phase of the wave at the output C of the phase shifter or transformer 4 is shifted as much as 180° ($\pi$ radians), because the secondary winding 13 thereof is wound inversely to the primary winding 12.

Figure 2:
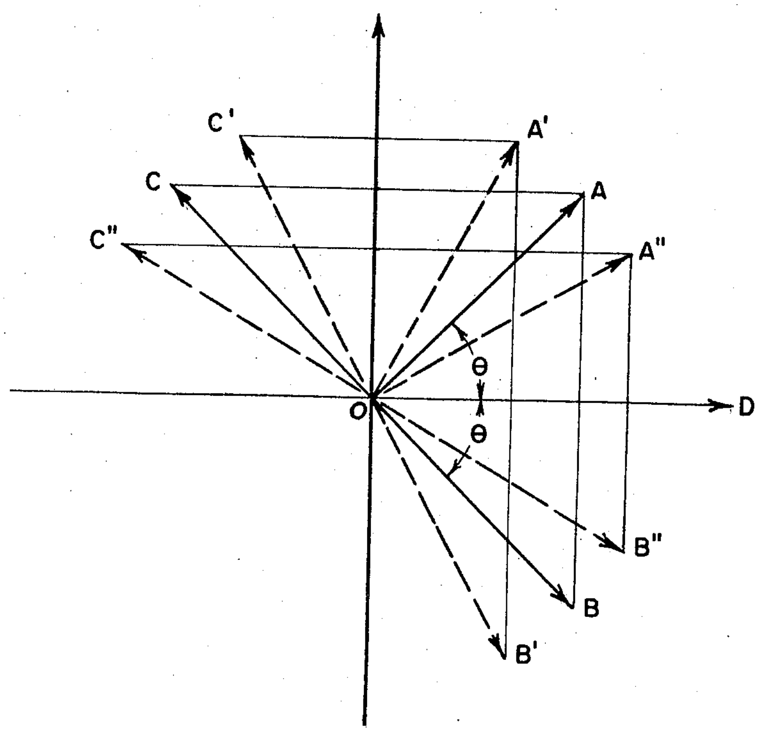
FIG. 2 is a vector diagram of voltages appearing in FIG. 1.

The phases of the voltages at the points A, B and C of FIG. 1 are illustrated as vectors $\overline{OA}$, $\overline{OB}$ and $\overline{OC}$ in FIG. 2 on the basis of the phase at the center point D of the delay line cable 1. The amplitudes of the phases of the voltages at the points A, B and C are approximately equal, because the delay line cable 1 and the phase shifter or transformer 4 have no reflection. The phase of the voltage at point A advances as much as $\theta$ radian and that at point B is delayed as much as $\theta$ radian, as compared with that at point D. $\theta$ can be obtained as follows:

$$\theta=\frac{l}{2}\cdot\frac{2\pi}{\lambda}\ \frac{l\cdot\lambda}{\lambda}\ \text{(radian)}$$

In the foregoing equation, $$\frac{2\pi}{\lambda}=\beta$$

is phase constant, $\lambda$ is the wavelength of the signal frequency.

When the frequency modulated signal deviates to a higher frequency, the vectors of the phases of the voltages at the points A, B and C are illustrated as $\overline{OA'}$, $\overline{OB'}$ and $\overline{OC'}$, respectively, in FIG. 2. When the signal frequency deviates to a lower frequency, the vectors of the phases of the voltages at the points A, B and C are illustrated as $\overline{OA''}$, $\overline{OB''}$ and $\overline{OC''}$, respectively, in FIG. 2. As shown in FIG. 2, it is found that the phase of the voltage between the points A and B and that of the voltage between the points A and C are always constant to the deviation of the frequency. That is, $\overline{AB}//\overline{A'B'}//\overline{A''B''}$ and $\overline{AC}//\overline{A'C'}//\overline{A''C''}$ in FIG. 2. Therefore, in the FM demodulator of the present invention, no relative delay time distortion occurs. This is the reason why the phases of the voltages $\overline{AB}$ and $\overline{AC}$ are always maintained at constant values, and the phase of the voltage at the point D is proportional to the frequency of the input signal.

It is also found that the magnitudes of the voltages between the points A and B, that is, $\overline{AB}$, and those of the voltage between the point A and C, that is, $\overline{AC}$, vary every moment in accordance with the frequency deviation of the input signal. The voltages $\overline{AB}$ and $\overline{AC}$ are respectively applied to the diodes 6 and 7 through the capaictors 8 and 9. Consequently, the voltages varying with the envelope line of the voltages $\overline{AB}$ and $\overline{AC}$ appear as the terminal voltages of the capacitors 8 and 9. Therefore, the differential component of the terminal voltages is derived from the output terminals 3 and 3′. The differential component is the video frequency that should be obtained as the demodulated output voltage, while the magnitudes of the voltages $\overline{AB}$ and $\overline{AC}$ vary in sine waveform to the frequency deviation as shown in FIG. 3.

Figure 3:
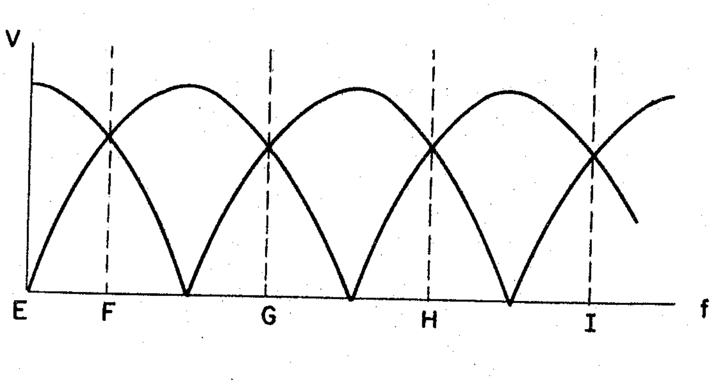
FIG. 3 is a graphical presentation of the voltages appearing in FIG. 1.

In FIG. 3, the abscissa indicates the frequency *f* and the ordinate indicates the voltage V. The curve (*a*) shows the process of the variation of the voltage $\overline{AB}$, the curve (*b*) that of the voltage $\overline{AC}$. The electrically equivalent length of the delay line cable 1 is so designed that the frequency corresponding to the cross points F, G, H, I and so on of the two curves in FIG. 3 becomes equal to the middle frequency of the input signal frequency band. The process of the wave between the points E and F in FIG. 3 corresponds to a quarter period of the waveform of the voltages $\overline{AB}$ and $\overline{AC}$. Therefore, a quarter wavelength of the middle frequency of the input signal frequency band has practically been selected as the electrically equivalent length of the delay line cable.

When the middle frequency of the input signal is 70 megacycles per second and coaxial cable filled with dielectrical material with a dielectric constant $\epsilon=2.2$ is utilized, the length of the delay line cable is about 71 cm. Then, the magnitude of the voltages $\overline{AB}$ and $\overline{AC}$ vary in sine waveform as the frequency deviation as shown in FIG. 3. Therefore, the characteristic of output voltage to the frequency is not compltely linear. However, this non-linear characteristic is practically no trouble. In a practical example, demodulation linearity was less than 1% at ±7 megacycles per second. When complete linearity is required, the non-linearity can be compensated by connecting a network which provides a characteristic of output voltage to frequency with the required hump in series with the input side of the FM demodulator. A suitable network may comprise, for example, a filter with a double-humped resonance curve.

Figure 4:
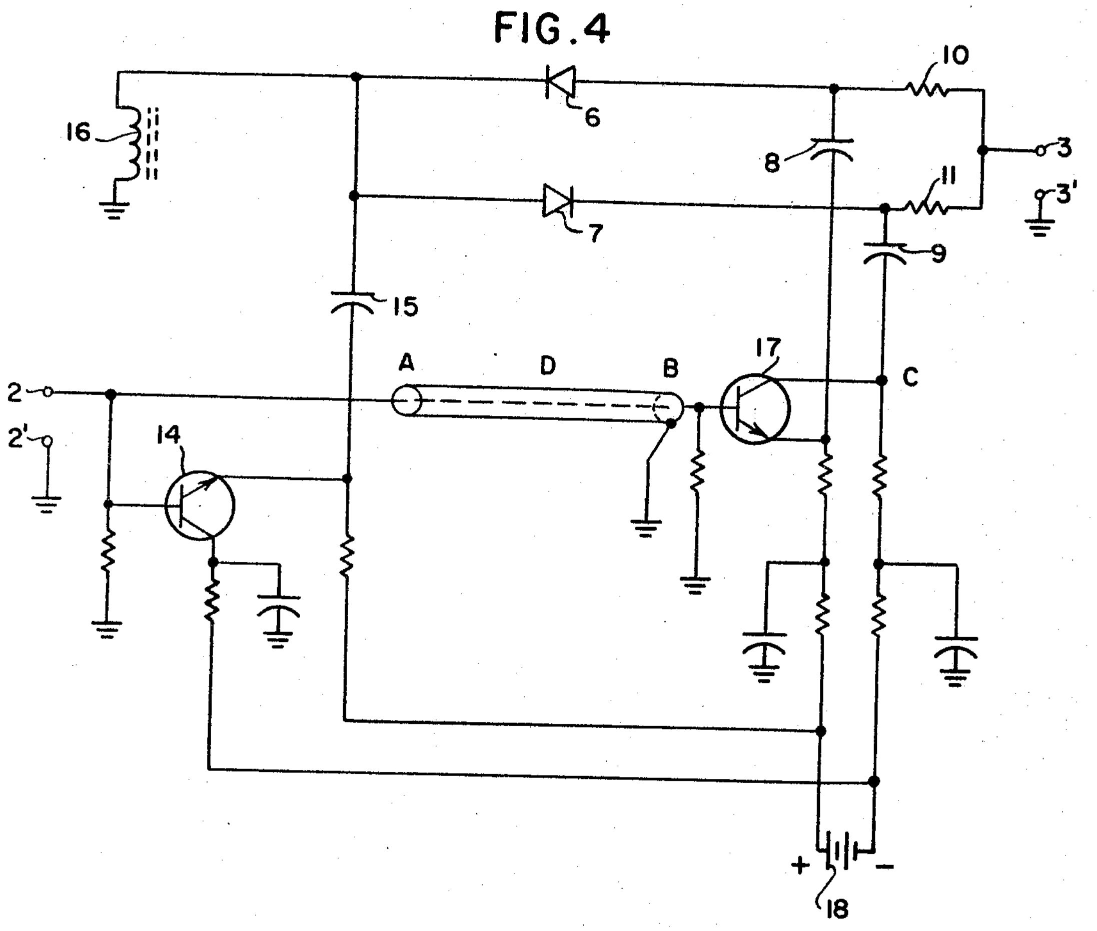
FIG. 4 is a circuit diagram of another embodiment of the FM demodulator of the present invention.

FIG. 4 is a circuit diagram showing another embodiment of the inevntion. In FIG. 4, an emitter follower NPN transistor 17 is utilized as a phase shifter instead of the transformer 4 in FIG. 1. The output voltages of the delay line cable 1 are applied to the base of the transistor 17. Then, the phase of the voltage appearing at the collector is inversely shifted as compared with the phase of the voltage applied to the base of the transistor 17. The collector of the transistor 17 corresponds to the point C in FIG. 1, while in order to avoid mismatching of the input impedance to the delay line cable, the input signal voltage is applied to the diodes 6 and 7 through a grounded collector transistor 14. This is the reason why the input impedance of the grounded collector transistor circuit has a great impedance. A capacitor 15 is employed as a coupling condenser for applying the voltages $\overline{AB}$ and $\overline{AC}$ to the diodes 6 and 7. A choke coil 16 is employed as a direct current bypass. The choke coil 16 obstructs the video frequency, of course. A battery 18 functions as a direct current source for the two transistors 14 and 17. The other components operate in the same manner as their counterparts of FIG. 1.

In both cases, as shown in FIGS. 1 and 4, the phase shifter inversely shifts the phase of the output voltage of the delay line cable. However, the phase shifter may comprise any phase shifter which can be employed with other change in circuit. The FM demodulator of the present invention has a relative delay time of zero. The demodulation linearity is less than 1% at ±7 megacycles per second. Moreover, the demodulation linearity can be easily improved to zero by suitable adjustment. A demodulation sensitivity of 20 mv./megacycle was obtained in an operating FM demodulator of the invention. Therefore, even when the FM demodulator is employed as a frequency discriminator in a wideband multiplex microwave communication system, no cross-talk distortion occurs.

The phase shifter may comprise a cathode follower vacuum tube amplifier. The diodes 6 and 7 may each comprise any suitable diode such as, for example, a semiconductor or vacuum tube diode. In the embodiment of FIG. 4, a cathode follower vacuum tube circuit may be utilized instead of the grounded collector transistor.

We claim:

1. An FM demodulator comprising a distributed constant delay line having an electrically equivalent length corresponding to the wave length of the middle frequency of an input signal frequency band, a phase shifter for shifting the phase of the output voltage of said delay line, two envelope detectors for detecting the voltage between the input and the output of said delay line and the voltage between said input and the output of said phase shifter, respectively, and means for producing differential component of the output voltages of said two detectors.

2. An FM demodulator as claimed in claim 1, wherein the electrically equivalent length of said distributed constant delay line is equal to a quarter wave length of the middle frequency of the input signal frequency band.

3. An FM demodulator as claimed in claim 1, wherein said phase shifter comprises a transformer with a winding ratio 1:1.

4. An FM demodulator as claimed in claim 1, wherein said phase shifter comprises an emitter follower transistor amplifier.

5. An FM demodulator as claimed in claim 1, wherein said phase shifter comprises a cathode follower vacuum tube amplifier.

6. An FM demodulator as claimed in claim 1, wherein one of said two envelope detectors comprises a diode, a resistor and a capacitor through which the voltage between the input of the delay line and the output of said delay line is applied to said diode, and the other of said envelope detectors comprises a diode, a resistor through which the differential component of the output video frequency is derived in cooperation with said first-mentioned resistor, and a capacitor through which the voltage between the input of the delay line and the output of said phase shifter is applied to the last-mentioned diode.

7. An FM demodulator as claimed in claim 6, wherein each of said diodes comprises a vacuum tube diode.

8. An FM demodulator as claimed in claim 6, wherein the voltage at the input of the delay line is applied through a grounded collector transistor circuit to said two envelope detectors.

9. An FM demodulator as claimed in claim 8, wherein the voltage at the input of the delay line is applied through a cathode follower vacuum tube circuit to said two envelope detectors.

References Cited by the Examiner

UNITED STATES PATENTS

| | | | |
|---|---|---|---|
| 2,580,148 | 12/1951 | Wirkler | 329—145 X |
| 2,664,505 | 12/1953 | Berger | 329—116 X |

ROY LAKE, *Primary Examiner.*

A. L. BRODY, *Assistant Examiner.*